United States Patent Office.

PAUL JULIUS, OF LUDWIGSHAFEN, GERMANY, ASSIGNOR TO THE BADISCHE ANILIN AND SODA FABRIK, OF SAME PLACE.

SAFRANIN AZO NAPHTHOL DYE.

SPECIFICATION forming part of Letters Patent No. 524,253, dated August 7, 1894.

Application filed April 21, 1892. Serial No. 430,113. (Specimens.) Patented in England March 13, 1891, No. 4,543; in Germany March 20, 1891, No. 61,692; in France March 23, 1891, No. 212,276; in Belgium July 31, 1891, No. 95,698; in Spain August 20, 1891, No. 12,328, and in Italy September 30, 1891, XXIV, 30,135, LIX, 128.

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of Coloring-Matters, (for which Letters Patent have been obtained in Germany, No. 61,692, dated March 20, 1891; in France, No. 212,276, dated March 23, 1891; in England, No. 4,543, dated March 13, 1891; in Belgium, No. 95,698, dated July 31, 1891; in Italy, XXIV, 30,135, LIX, 128, dated September 30, 1891, and in Spain, No. 12,328, XIII, 439, dated August 20, 1891,) of which the following is a specification.

I have discovered that safranin-azo-naphthol bodies heretofore known as insoluble precipitates can be rendered soluble and converted into a lake or pigment of great value in the dyeing industry, and I have described this invention in an application for a patent filed by me April 1, 1893, Serial No. 468,691, which contains a generic claim for a soluble safranin-azo-naphthol body in which I do not confine myself to a specific safranin or to either alpha or beta naphthol.

In this present application I desire to claim a specific soluble safranin-azo-naphthol body which is prepared from dimethyl safranin and alpha naphthol.

The following is an example in which my invention can be carried into effect. The parts are by weight.

Make a one per cent. solution of dimethyl safranin taking about seven and seven-tenths (7.7) parts (one molecular proportion) of the dimethyl safranin, diazotize by adding first a solution of sodium nitrite containing about fourteen (14) parts of that salt, (one molecular proportion) and then twenty-three (23) parts of hydrochloric acid containing about thirty-three per cent. of real acid (HCl). The solution during these operations must be kept cold with ice and stirred. Next run the mixture into an ice-cold solution of about three (3) parts of alpha-naphthol (one molecular proportion) in about one hundred and sixty (160) parts of water and twenty-five (25) parts of caustic soda solution, containing about thirty-five (35) per cent. of sodium hydrate NaOH), stir the mixture thoroughly for several hours, then filter off the blackish violet precipitate of dimethyl-safranin-azo-alpha-naphthol thus formed. Now wash well with cold water prolonging this until the liquor running off is deeply colored and shows that a soluble product has resulted. The paste then remaining on the filter contains the soluble dimethyl-safranin-azo-alpha naphthol and it can be diluted or made up to a standard strength. Or without washing so thoroughly the soluble dimethyl safranin azo-alpha naphthol can also be prepared in the form of a paste as follows: stir the azo-body obtained as above described with a little water and mix gradually with hydrochloric acid, until a test portion of the paste obtained is completely soluble in hot water. To prepare the soluble paste from the quantity of dimethyl safranin described in the above example about two and one-fifth (2.2) parts of hydrochloric acid containing about thirty-three per cent. of real acid (HCl) may be used at this stage of the process. The paste so obtained contains the soluble dimethyl-safranin-azo-alpha naphthol in the form of a salt and can be diluted or made up to a standard strength. Instead of hydrochloric acid other acids may be used such as acetic, sulphuric, nitric, oxalic and tartaric acids, also salts which act as acids; but of these hydrochloric and acetic acids give the best results.

If it is desired to prepare the soluble dimethyl-safranin-azo-alpha naphthol in a dry state, the paste obtained by the action of hydrochloric acid as above stated, may be suspended in about four hundred (400) parts of water and in the cold sufficient hydrochloric acid added, to reprecipitate the dimethyl-safranin-azo-alpha naphthol from the violet solution formed. About forty-five (45) parts of hydrochloric acid containing about thirty per cent. of real acid (HCl) will usually be necessary. Allow to cool, filter, wash, press and dry carefully at a low temperature.

In order to render the soluble dimethyl-safranin-azo-alpha naphthol available in the dyeing industry, I convert the same into a tanno-metallic lake or pigment as fully described in the application, Serial No. 468,691, above named.

The soluble dimethyl-safranin-azo-alpha naphthol, when dry, forms a dark colored powder with a slight metallic sheen, giving a violet black paste. It is soluble in both hot and cold water, insoluble in alkalies, soluble in alcohol and practically insoluble or very slightly soluble in benzene; it dissolves in sulphuric acid giving a blackish yellow solution; on reduction with stannous chloride and hydrochloric acid the amido-naphthol obtained can be recognized as being in the form known to chemists as alpha-amido-alpha naphthol and finally on careful and moderate reduction with zinc dust and acetic acid dimethyl-safranin is regenerated.

I do not claim in this application generically a safranin-azo-naphthol body soluble in water, such being embodied in the second claim contained in the application filed by me April 1, 1893, Serial No. 468,691.

What I claim as new, and desire to secure by Letters Patent, is—

As a new article of manufacture dimethyl-safranin-azo-alpha naphthol which is soluble in water and when dry forms a dark colored powder with a slight metallic sheen, insoluble in alkalies, soluble in alcohol, practically insoluble or very slightly soluble in benzene, soluble in sulphuric acid giving a blackish yellow solution; on reduction with stannous chloride and hydrochloric acid alpha-amido-alpha naphthol is obtained and finally on reduction with zinc dust and acetic acid dimethyl safranin is regenerated.

In testimony whereof I have hereunto set my hand in the presence of two subscribing witnesses.

PAUL JULIUS.

Witnesses:
ERNEST F. EHRHARDT,
CARL KLOTZ.